(12) United States Patent
Banta (10) Patent No.: US 8,291,663 B2
(45) Date of Patent: Oct. 23, 2012

(54) DRYWALL SEALING TAPE

(76) Inventor: Mark K. Banta, Spring Valley, CA (US)

( * ) Notice: Subject to any disclaimer, the term of this patent is extended or adjusted under 35 U.S.C. 154(b) by 1499 days.

(21) Appl. No.: 11/464,045

(22) Filed: Aug. 11, 2006

(65) Prior Publication Data

US 2008/0034694 A1 Feb. 14, 2008

(51) Int. Cl.
*E04B 2/00* (2006.01)
*B32B 3/00* (2006.01)
*B32B 9/00* (2006.01)

(52) U.S. Cl. ............... 52/417; 52/420; 428/61; 428/105

(58) Field of Classification Search ............ 52/417, 52/420, 460, 476; 428/906, 105, 107, 109, 428/110, 343
See application file for complete search history.

(56) References Cited

U.S. PATENT DOCUMENTS

| | | | | |
|---|---|---|---|---|
| 1,703,667 A | * | 2/1929 | Green | 52/417 |
| 2,275,815 A | * | 3/1942 | Crandell | 52/417 |
| 2,314,523 A | * | 3/1943 | Speer | 52/417 |
| 2,667,822 A | * | 2/1954 | Christman | 264/156 |
| 4,135,017 A | | 1/1979 | Hoffmann, Sr. | |
| 4,719,734 A | * | 1/1988 | Fell et al. | 52/302.1 |
| 4,722,153 A | * | 2/1988 | Hardy | 52/255 |
| 4,977,718 A | * | 12/1990 | Hoffman, Sr. | 52/287.1 |
| 5,037,686 A | * | 8/1991 | Conboy | 428/43 |
| 5,198,300 A | * | 3/1993 | Matthews et al. | 428/354 |
| 5,246,775 A | * | 9/1993 | Loscuito | 428/343 |
| 5,418,027 A | | 5/1995 | Conboy | |
| 5,486,394 A | | 1/1996 | Stough | |
| 5,687,523 A | | 11/1997 | Stough | |
| 5,820,958 A | | 10/1998 | Swallow | |
| 5,895,301 A | | 4/1999 | Porter et al. | |
| 6,226,946 B1 | | 5/2001 | Stough et al. | |
| 6,226,957 B1 | * | 5/2001 | Stough | 52/745.2 |
| 6,526,715 B2 | * | 3/2003 | Kaneko et al. | 52/483.1 |
| 6,586,080 B1 | * | 7/2003 | Heifetz | 428/198 |
| 7,141,284 B2 | * | 11/2006 | Newton et al. | 428/40.1 |
| 2002/0157573 A1 | * | 10/2002 | Pellett | 106/400 |
| 2006/0191237 A1 | * | 8/2006 | Hansen | 52/746.1 |
| 2008/0128070 A1 | * | 6/2008 | Goldman | 156/71 |

* cited by examiner

*Primary Examiner* — Branon Painter
*Assistant Examiner* — Elizabeth A Plummer
(74) *Attorney, Agent, or Firm* — The Maxham Firm (57) ABSTRACT

A drywall sealing tape which includes a substrate layer and a mesh layer made of mesh filament. The mesh layer is an array of filaments formed together which, when adjacent the substrate, create an inter-filament cavity for receiving and retaining joint compound between the substrate and the drywall panel. In use, the drywall sealing tape of the present invention may be coated with joint compound and applied to a drywall panel. The inter-filament cavities retain a volume of joint compound corresponding to the approximate thickness of the mesh filament. The joint compound retained within the cavities serves to bond the drywall sealing tape of the present invention to the drywall panels, and provides a seamless, crack-resistant surface.

21 Claims, 6 Drawing Sheets

DRYWALL SEALING TAPE

BACKGROUND

1. Field of the Invention

The present invention relates generally to building materials. The present invention is more particularly, though not exclusively, related to a materials used to finish interior and exterior walls, namely, a sealing tape for use in conjunction with joint compound to seal drywall panels together, as well as for corner bead for interior and exterior corners.

2. Discussion of Prior Art

In modern construction, both commercial and residential building techniques typically incorporate the use of interior wall boards. These boards are available in standard dimensions of 4×8, 4×10, 4×12, for example, and are intended to be mounted to standard wood or metal studs having separations of typically 16 or 24 inches for walls and ceilings. These wall boards are generally referred to as drywall, and also may be called gypsum board, wallboard, gyp-board, and Sheetrock (a registered trademark of United States Gypsum Company). Drywall consists of a core of plaster-like gypsum sandwiched between layers of heavy paper. The long edges of the drywall panels are tapered so that when panels are set adjacent to each other, the factory edges create a shallow recess. This recess is intended to facilitate the smooth sealing of the drywall panels together using joint compound (also referred to as "mud") and tape. The end of a drywall panel (normally the four-foot length) is cut, not tapered, and it is much more difficult to conceal the butt end or the cut edge.

Over the years, the methods for sealing drywall panels have evolved from a simple paper tape, to sophisticated elastic adhesive strips. For example, the original paper tape used to seal drywall joints consisted of a thick paper tape that was coated on top and bottom with joint compound and placed over a seam. This was allowed to dry, and one or more additional coats of joint compound were applied over the now-dry tape to smooth the seam to match the drywall panels. A variety of devices were also used to increase the speed of applying the paper tape and joint compound. One device, often referred to as a "bazooka," dispenses both the paper tape and the joint compound simultaneously to cover seams in one simple step. If a seam is being taped by hand, the seam receives a bed of mud, then tape is applied, then more coats of mud are applied.

While the paper drywall tape is generally effective, it can be difficult to handle due to the slippery nature of the joint compound used to hold it in place, and it is prone to shrinkage when drying. This can be particularly problematic in seam applications where a significant volume of joint compound is necessary, that is, for larger seam widths (up to 0.375 inch, for example), factory to butt seams, and patchwork. When attempting to avoid the shrinkage of a sealed joint and reduce drying time, it has been common practice to minimize the thickness of the coat of joint compound between the paper tape and the drywall panels, often called the "bedding" coat. However, if too little joint compound remained between the paper tape and the drywall panel following application of the tape, the tape would simply fall off or "bubble" in the areas of very thin joint compound once it had dried. Excessive shrinkage, difficult application, and extended drying times have made paper tape an unpopular choice amongst many drywall professionals.

Another alternative taping method included the use of a mesh tape, formed with a mesh pattern of fibrous material. This mesh tape often is coated on one side with a slight adhesive material to facilitate placement of the mesh tape on the drywall panel. Once in position, this mesh tape is covered with joint compound and allowed to dry. Due to the rough and perforated surface texture of the mesh tape, joints sealed with this tape are often prone to cracking or showing the mesh pattern in the dried joint compound. This method often requires multiple coats to achieve a smooth wall surface.

Another drawback of the mesh tape is the ability of the joint compound to pass completely through the mesh if too much pressure is applied by the taping knife during the application process. In these instances, the upper surface of the mesh tape has no joint compound covering and can be totally exposed. Eventually, the mesh tape can simply peel from the wall leaving a checkerboard pattern of joint compound on the wall. Also, hairline cracks which develop in a wall, at a seam, or at corners, can be visible through the mesh tape, which would otherwise be hidden from view by an opaque tape, such as the paper tape described above. Such small cracks are particularly prevalent near doors or windows, often occurring with the first resounding closure of such openings.

As an alternative to traditional paper and mesh tapes, U.S. Pat. No. 5,486,394, entitled "Self-Release Self-Adhesive Drywall Tape," discloses a drywall tape having a web layer sandwiched between a top layer and a base layer, with an adhesive coating on the base layer. This adhesive layer facilitated placement of the tape over a seam without the need for joint compound to retain its position. Once in position, the seam between the drywall panels could be covering with joint compound to create a continuous flat wall panel surface.

While the initial installation of the tape described in the '394 patent may be much easier than traditional paper tape, it has a serious drawback. Specifically, the tape is only held in place on the wall seam with the adhesive, instead of with joint compound which exhibits a superior bond to the drywall panels. Thus, when the adhesive eventually weakens, the tape will delaminate from the drywall panels, likely crack through the overcoat of joint compound, and leave an unsightly joint. Further, because the joint is not sealed using a joint compound that has similar expansion characteristics of the drywall panels themselves, walls exposed to severe temperature and humidity variations will be prone to cracking.

As another alternative, U.S. Pat. No. 5,687,523, entitled "Drywall Tape," discloses a tape formed with an array of perforations intended to allow the joint compound to pass through the tape to contact the drywall panels. These perforations may help the mud under the tape to dry faster, but they do not facilitate the attachment of the tape to the drywall panels because the mud is directly in contact with the panel, and any joint compound passing through the perforations merely contacts the drywall panel in the areas of the pinhole perforations, and does not wick between the tape and the drywall panel.

U.S. Pat. No. 5,820,958, entitled "Non-Cracking, Smooth, and Flat Patch for Wall Cracks," discloses a tape formed of an elastic membrane having adhesive strips which facilitate the attachment to the wall panels. This tape is positioned over a crack or joint in a wall, and the adhesive strips are pressed into place on the wall. Once in position, joint compound is applied to the outer surface of the tape to create a smooth wall surface.

While very easy to install, the tape of the '958 patent can be prone to cracking. This is particularly so when used with joint compound, as the elastic nature of the tape results in a pliable wall surface, which is inconsistent with the rigid nature of dried joint compound. As a result, cracks sealed using this tape often will quickly form new cracks and result in mud delamination from the elastic membrane.

In light of the above, it would be advantageous to provide a joint sealing tape that cooperates with the drywall panels so as to adhere securely to the panels with a gypsum to gypsum bond and adhesion by suction, while exhibiting similar expansion properties as the drywall, thereby minimizing cracking of joints and seams. It would also be advantageous to provide a joint sealing tape that is stronger, easy to apply, permanent, easy to manufacture, and relatively cost effective.

SUMMARY OF THE INVENTION

The drywall sealing tape of the present invention is typically presented in roll form and ready for application to drywall panels for sealing joints between the panels, and for covering defects. This drywall sealing tape includes a substrate layer, such as paper, and a mesh layer made of mesh filament, such as a synthetic material nylon. The mesh layer is an array of filaments formed together which, when adjacent the substrate, create inter-filament cavities for receiving and retaining joint compound between the tape and the drywall panel.

In use, the drywall sealing tape of the present invention is coated with joint compound, and applied to a drywall panel, or it can be hand applied to a bed of mud. During application, a joint compound trowel is used to smooth the substrate against the seam in the drywall panel. Due to the thickness and arrangement of the filaments in the mesh layer, despite the pressure of the trowel on the upper surface of the sealing tape and the possible compression of the filaments, the inter-filament cavities retain an appropriate volume of joint compound corresponding to the approximate thickness of the mesh filament. The joint compound retained within the cavities serves to bond the drywall sealing tape of the present invention to the drywall panels, and provide a seamless, crack-resistant, and stronger seam than occurs with paper or mesh alone.

The controlled retention of joint compound between the substrate and the drywall panel avoids the formation of loose joints or bubbles, and is a major improvement over previously available joint sealing tapes. The volume of joint compound retained in the inter-filament cavities may be determined by the thickness of the mesh filament. Specifically, the thicker the filament, the deeper the inter-filament cavity will be.

In an alternative embodiment, the drywall sealing tape of the present invention may be provided in a two-part form in which the mesh layer and the substrate are combined at the time of application to a drywall panel. To facilitate this, the mesh layer may be coated with an adhesive to provide an attachment between the mesh layer and the substrate. Also, the drywall sealing tape of the present invention may be applied using a drywall sealing tape applicator, commonly referred to as a "bazooka." It may also be applied by spool, by hand, or by using a "banjo," another tool used for such purposes.

BRIEF DESCRIPTION OF THE DRAWING

The nature, objects, and advantages of the present invention will become more apparent to those skilled in the art after considering the following detailed description in connection with the accompanying drawing, in which like reference numerals designate like parts throughout, and wherein.

DETAILED DESCRIPTION OF PREFERRED EMBODIMENTS

Figure 1:
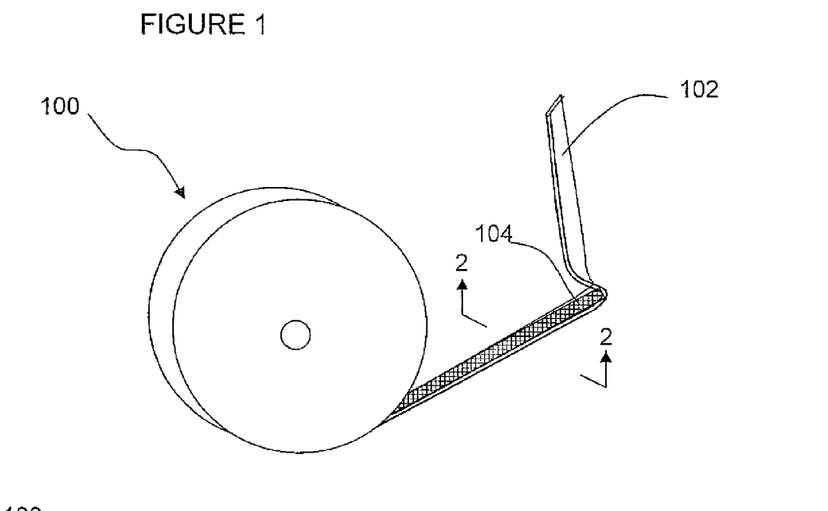
FIG. 1 is a perspective view of the drywall sealing tape of the present invention, depicted in roll-form and ready for application to drywall panels for sealing joints between the panels, and for covering defects.

Referring initially to FIG. 1, a perspective view of the drywall sealing tape of the present invention is shown and generally designated by reference numeral 100. Drywall sealing tape 100 is depicted in roll-form, and ready for application to drywall panels for sealing joints between the panels, and for covering defects.

Figure 2:
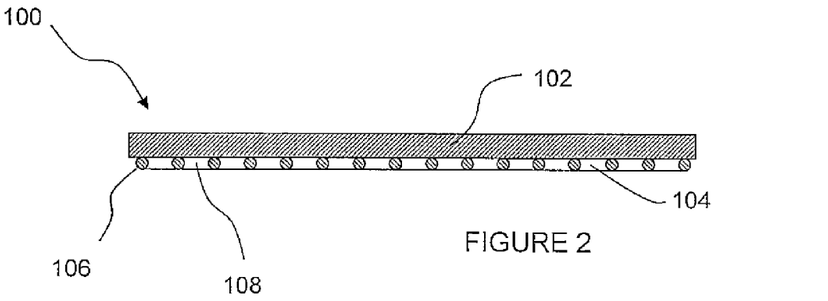
FIG. 2 is a sectional view of the drywall sealing tape of the present invention taken along line 2-2 of FIG. 1, showing the substrate layer and the mesh layer made of mesh filament and defining an inter-filament cavity for receiving and retaining joint compound.

A more detailed view of the drywall sealing tape of the present invention is shown in section in FIG. 2. From this view, the drywall sealing tape is shown to have substrate layer 102 and mesh layer 104, attached together to form a unitary sealing tape.

Substrate layer 102, in a preferred embodiment, may be a paper tape, such as the paper joint sealing tape previously used in the industry. Alternatively, substrate layer 102 may be a synthetic material having a characteristic of bonding securely to joint compound, while exhibiting the flexible qualities needed for application to sealing joints in drywall panels. Substrate layer 102 may be coated with a joint compound bonding material to increase bond strength between sealing tape 100 and joint compound on the drywall panels.

Mesh layer 104 includes a mesh made from mesh filament 106. The particular orientation of the mesh filament is not critical, and thus the mesh pattern may vary so long as there are gaps within the mesh material sufficient to accept joint compound within the mesh. Mesh filament 106, in a preferred embodiment, is a synthetic mesh material, such as glass fibers or nylon. It is to be appreciated that other filament materials known in the art may be used to form mesh layer 104 without departing from the present invention.

In applications requiring added strength, a metal mesh or a rigid vinyl mesh may be used. A corrosion-resistant coating may be applied to the metal mesh to eliminate corrosion due to exposure to moisture within the joint compound. These variations will provide increased rigidity for seam-sealing applications needing increased strength, such as on inside or outside corners and on high-stress points.

Figure 3:
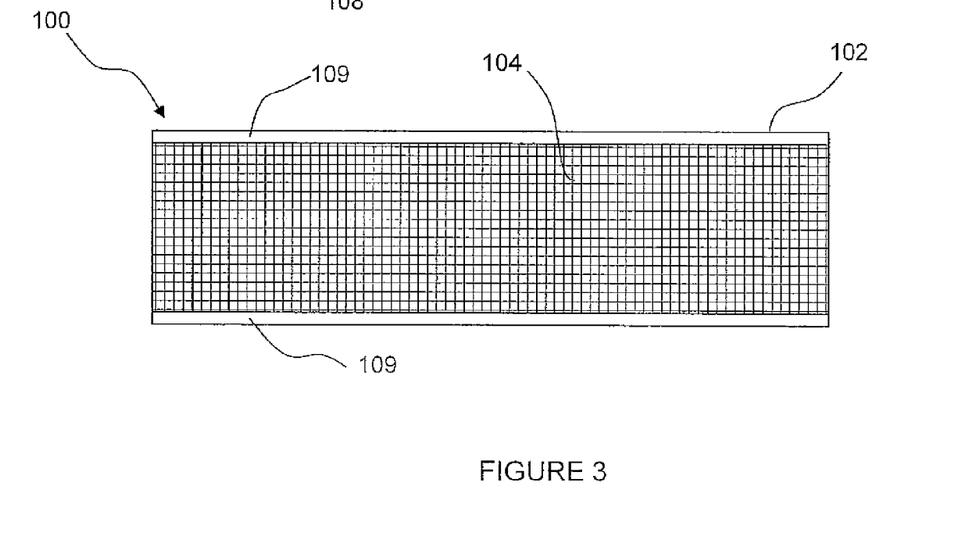
FIG. 3 is a bottom view of the drywall sealing tape of the present invention showing the placement of the mesh layer on the substrate and having an array of inter-filament cavities across substantially the entire surface of the substrate, for placement against a drywall panel.

Substrate 102 and mesh layer 104 together define inter-filament cavity 108 for receiving and retaining joint compound (not shown this figure). FIG. 3, a bottom view of the drywall sealing tape, provides an example of the orientation of filaments 106 in mesh layer 104, as well as the placement of mesh layer 104 on substrate 102. As shown, filaments 106 in the mesh layer 104 are in a rectangular pattern, and cover substantially the entire surface of substrate 102. In some cases, longitudinal side strips 109 of substrate 102 may be without mesh layer 104. This provides a more flexible edge of substrate 102 and allows for a smoother transition between sealing tape 100 and the drywall panels.

Figure 4:
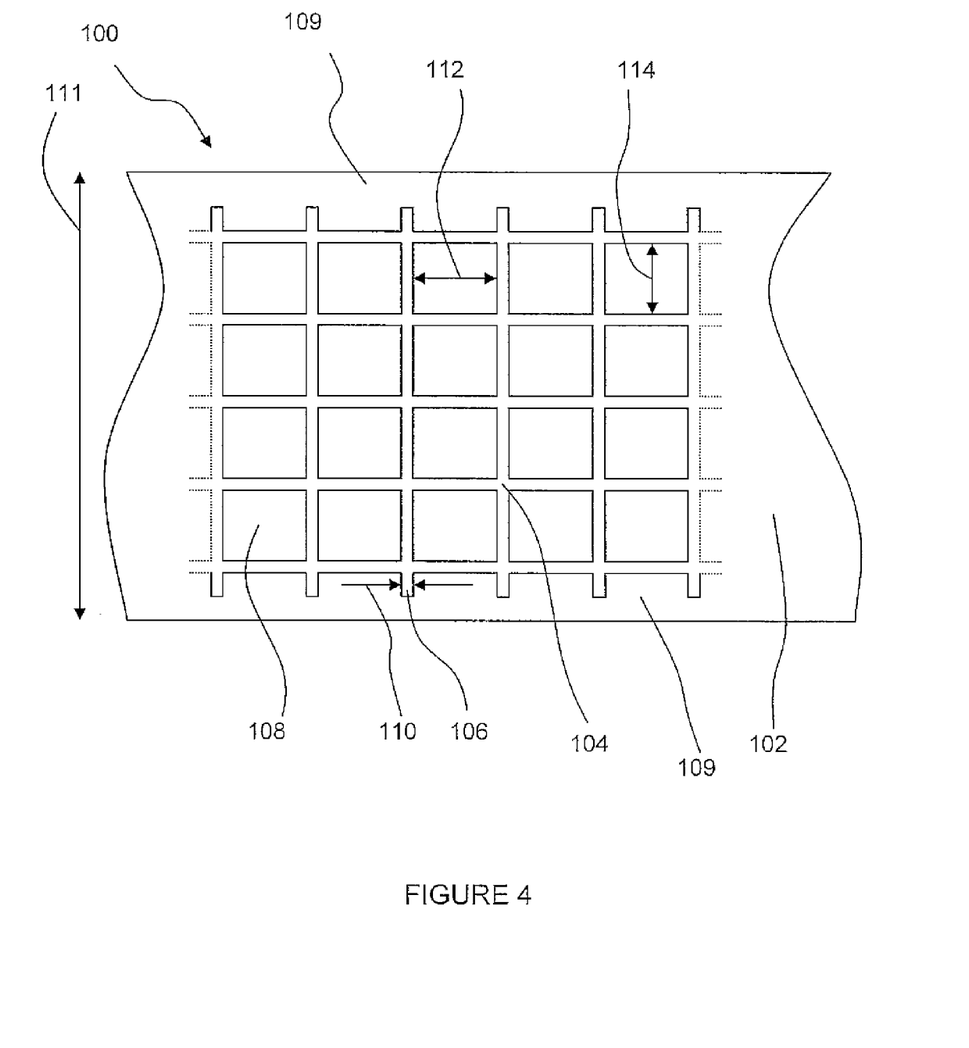
FIG. 4 is an enlarged detail plan view of a segment of the drywall sealing tape of the present invention showing the substrate having a mesh layer defining an array of inter-filament cavities, with the cavities in the mesh layer shown to have dimensions, and the filament having a diameter which corresponds to the depth of the inter-filament cavities.

Referring now to FIG. 4, a detailed view of drywall sealing tape 100 of the present invention is shown. Drywall sealing tape 100 includes substrate 102 having mesh layer 104 thereon defining an array of inter-filament cavities 108. The inter-filament cavities 108 in the mesh layer are shown to have dimensions 112 and 114, and the filament 106 is shown to have a diameter 110. In a preferred embodiment, the pattern of filament 106 is rectangular; however, other patterns are contemplated. In a preferred embodiment, width 111 of substrate 102 is approximately 2.0 inches, the dimensions 112 and 114 are approximately 0.10 inches, and filament diameter 110 is approximately 0.025 inches. However, dimensions 111, 112, 114, and 110 are not critical to the present invention, and those values presented herein are merely exemplary of a preferred embodiment.

Mesh layer 104, in a preferred embodiment, may be formed from a traditional woven mesh fabric, or may be formed from a simple overlapping filament 106 arrangement wherein the filaments in one direction are on the bottom, and the filaments in the perpendicular direction are on the top of the mesh layer 104.

An important characteristic of mesh layer 104 of the present invention is that this mesh layer must provide for the acceptance of joint compound within inter-filament cavities 108. Moreover, the surface area of the substrate occupied by filaments 106 of the mesh layer must be minimized in order to retain joint compound in the inter-filament cavities. This is particularly advantageous because one of the significant benefits of the present invention is the enhanced bonding which occurs with the joint compound captured between substrate 102 and the drywall panel. With this embodiment, even under heavy knife pressure, the ideal amount of mud and the flattest possible joint are achieved.

Figure 5:
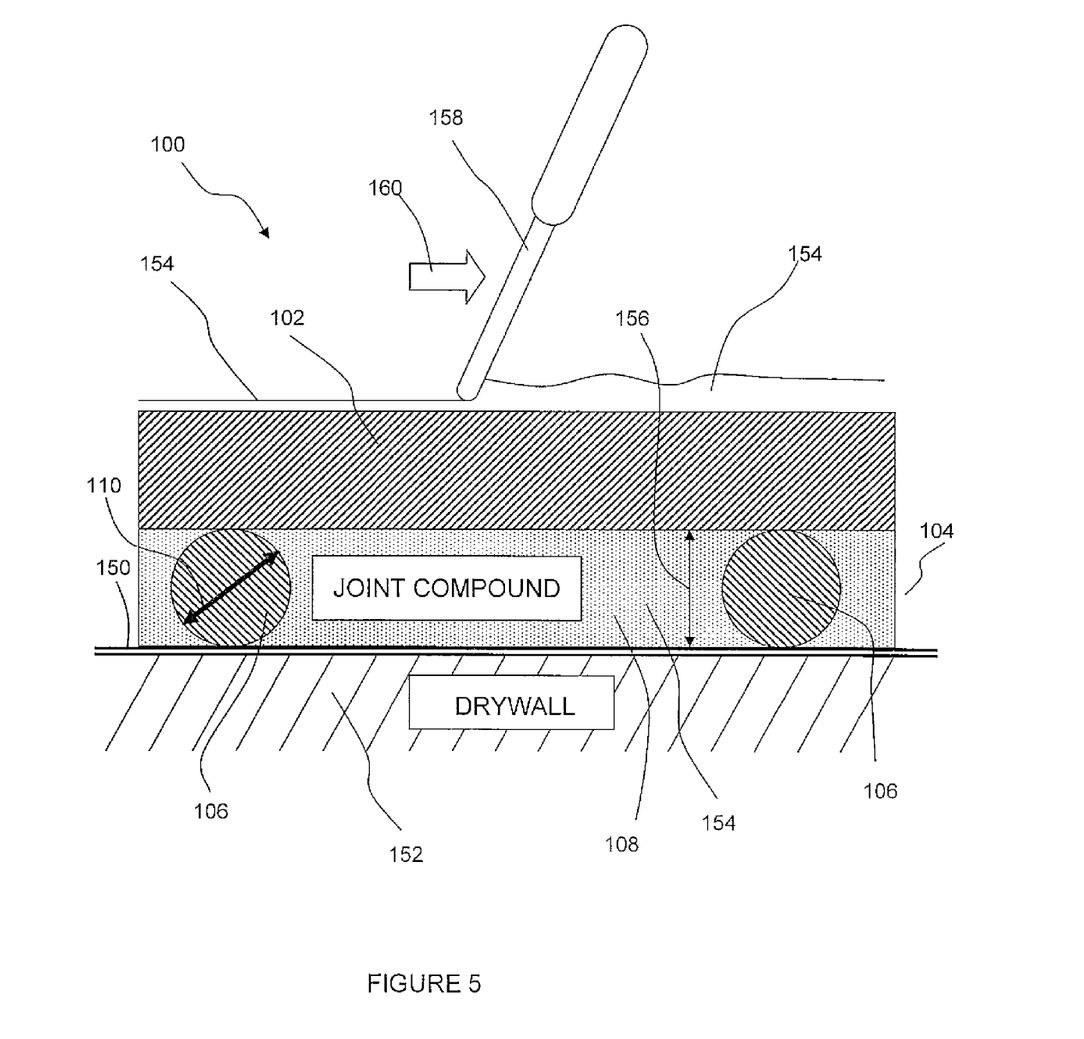
FIG. 5 is a greatly enlarged cross-sectional view of the drywall sealing tape of the present invention being applied to a drywall panel and showing the substrate and mesh layer adjacent a drywall panel with the inter-filament cavities filled with joint compound having a thickness corresponding to the thickness of the mesh filament.

Referring now to FIG. 5, a greatly enlarged cross-sectional view of drywall sealing tape 100 of the present invention is shown being applied to surface 150 of drywall panel 152. From this view, it can be seen that substrate 102 and mesh layer 104 are placed adjacent drywall panel 152 with the inter-filament cavities 108 filled with joint compound 154. The thickness 156 of joint compound 154 within inter-filament cavity 108 corresponds to dimension 110 of filament 106. It is to be appreciated, however, that dimension 110 of the filament may decrease when the sealing tape is exposed to moisture within the joint compound, and the mechanical application to a drywall panel. Also, while filament 106 is shown to have a circular cross-section, it is to be appreciated that filaments having other cross-sectional shapes may be used. For instance, an alternative embodiment of the present invention may be made with filaments having an oval or a rectangular cross-section.

During application, a coating of joint compound 154 may also be provided on the surface of substrate 102, and smoothed using a taping knife 158 or trowel, for example. As taping knife 158 is scraped across the surface of substrate 102 in direction 160, air bubbles which may exist within joint compound 154 are squeezed from the inter-filament cavity 108, leaving it filled with joint compound 154. As joint compound 154 dries, substrate 102 is securely drawn against the mesh layer 104 and toward surface 150 of drywall panel 152.

Figure 6:
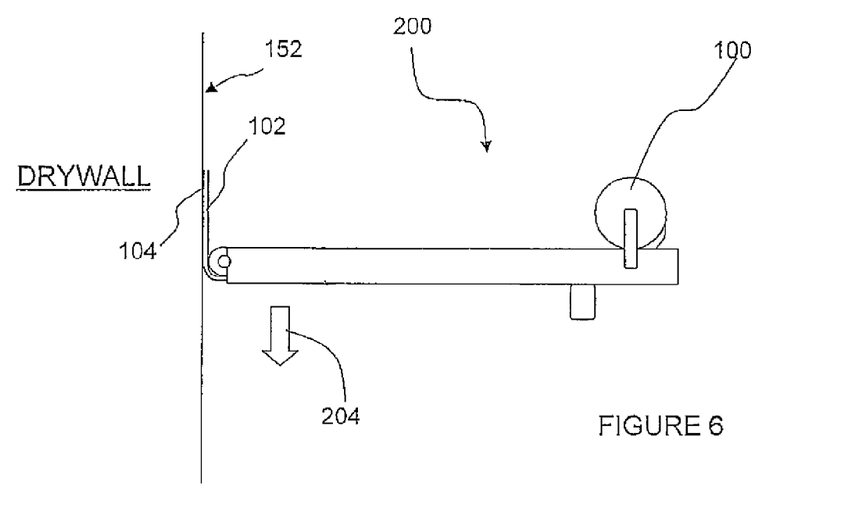
FIG. 6 is a simplified side view of a drywall sealing tape applicator, or bazooka, dispensing the drywall sealing tape of the present invention, with the sealing tape being coated with joint compound and placed on a drywall panel as the applicator is advanced along the wall seam.

As a method of application, the drywall sealing tape of the present invention may be applied using a drywall sealing tape applicator 200, commonly referred to as a "bazooka", as shown in FIG. 6. As shown, applicator 200 receives a roll of drywall sealing tape 100. A portion of the tape is inserted through the applicator where it is combined with joint compound from an interior reservoir. The combination of drywall sealing tape 100 coated with joint compound passes from the tip of the applicator, for placement on a drywall panel as the applicator is advanced along the wall seam in direction 204. Once in position on drywall panel 152, the sealing tape may be smoothed using a taping knife as discussed above in conjunction with FIG. 5, and as is known in the art.

Figure 7:
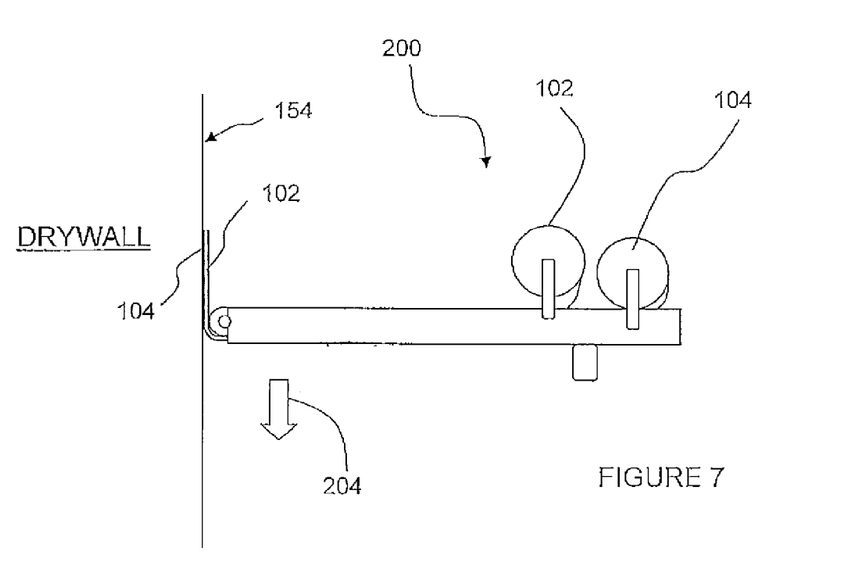
FIG. 7 is a side view similar to FIG. 6 showing an alternative embodiment of a drywall sealing tape applicator having a drywall sealing tape of the present invention formed from a two-part combination of a substrate and a mesh layer which are combined in the applicator and dispensed along with joint compound for application along the wall seam.

Referring to FIG. 7, a side view of an alternative embodiment of a drywall sealing tape applicator 200 is shown. Applicator 200 includes the drywall sealing tape of the present invention formed from a two-part combination of substrate 102 and mesh layer 104 which are combined in the applicator. As shown, rolls of substrate 102 and mesh layer 104 are attached to applicator 200 and inserted through the applicator where they are combined to form sealing tape 100. This sealing tape is coated with joint compound and is dispensed from the applicator for application along the wall seam.

Figure 8:
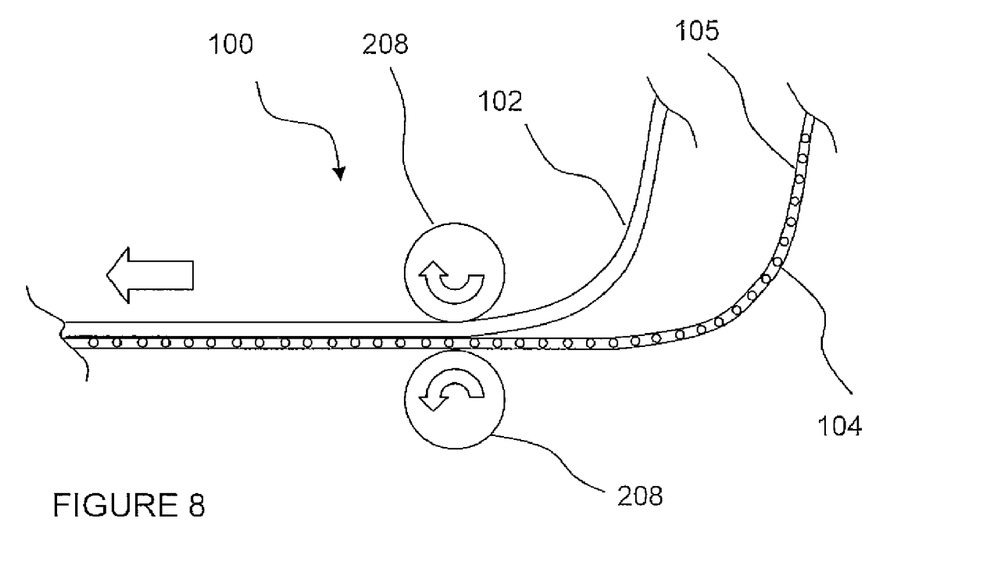
FIG. 8 is a fragmentary side view of the two-part embodiment of FIG. 7 of the drywall sealing tape of the present invention showing the adhesive side of the mesh layer being placed against the substrate to form a unitary sealing tape for use.

FIG. 8 provides a detailed side view of the two-part embodiment of the drywall sealing tape of the present invention showing mesh layer 104 formed with an adhesive coating 105. The adhesive coating on the mesh layer attaches to substrate 102 to retain the mesh layer securely on the substrate to form unitary sealing tape 100. Alternatively, adhesive coating 105 may be placed on substrate 102. In alternative embodiments, there may be no specific need for an adhesive coating, as the characteristics of the substrate and mesh materials themselves may provide an attractive force between them, such as static electricity created from the un-rolling of the materials. Further, compression rollers 208 may be provided to physically force mesh layer 104 to substrate 102 for application.

Figure 9:
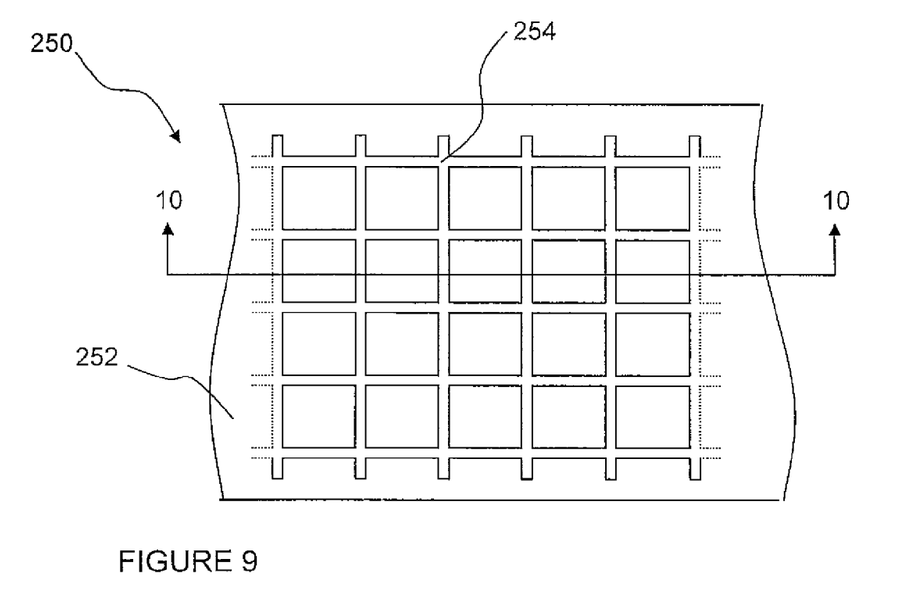
FIG. 9 is a plan view of an alternative embodiment of the drywall sealing tape of the present invention having a grid-pattern embossed into the substrate to form cavities for receiving and retaining joint compound between the sealing tape and the drywall panels.
Figure 10:
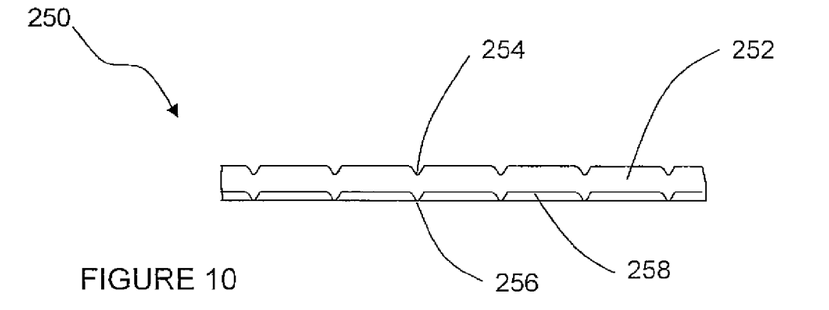
FIG. 10 is a cross-section of the drywall sealing tape of FIG. 9 as taken along line 10-10, and showing the impressions which result in protrusions that form the cavities to receive joint compound.

Referring now to FIGS. 9 and 10, an alternative embodiment of the drywall sealing tape of the present invention is shown and generally designated by reference numeral 250. Drywall sealing tape 250 includes a substrate 252 that is formed with a pattern 254. FIG. 10 is a cross-sectional view of the drywall sealing tape of FIG. 9, and shows impressions 254 formed in the substrate which result in a corresponding protrusion 256 on the opposite side. Protrusions 256 form cavities 258 which receive joint compound, and retain the joint compound in place as the drywall sealing tape 250 is being applied.

Figure 11:
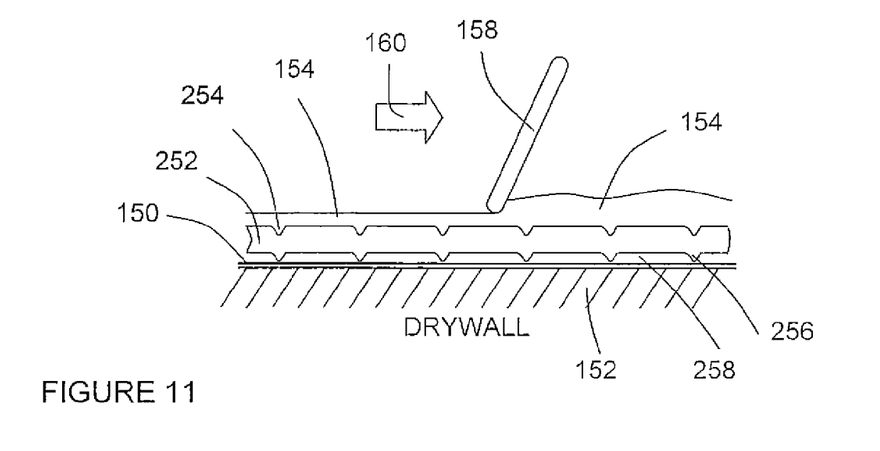
FIG. 11 is a cross-sectional view of the drywall sealing tape of FIG. 9 as used and applied to a drywall panel and coated with joint compound.

Use of drywall sealing tape 250 is shown in FIG. 11, as being applied to surface 150 of drywall panel 152. Specifically, FIG. 11 is a cross-sectional view of the drywall sealing tape 250 of FIG. 9 as used and applied to drywall panel 152 and coated with joint compound 154. Protrusions 256 embossed into substrate 252 form cavities 258 for receiving and retaining joint compound 154 between the drywall sealing tape and the drywall panels, in the same manner as discussed with the previous embodiments.

As taping knife 158 is advanced along the drywall sealing tape in direction 160, joint compound 154 is smoothed and substrate 252 is smoothed, thereby removing air bubbles from the joint compound in cavities 258, while simultaneously filling impressions 254. As the joint compound dries, the drywall sealing tape is bonded to surface 150 of the drywall panel.

The drywall sealing tape according to embodiments of this invention offers several advantages over the known prior art. To emphasize the positive aspects described above, the present sealing tape provides improved sheer strength, improved durability, enables full coverage of relatively wide seams (up to about 0.375 inch), and better withstands seismic events without cracks resulting.

The drywall sealing tape of the present invention as herein disclosed has been described to include a number of cavities for receiving and retaining joint compound. The several embodiments of this drywall sealing tape depict various structures to form the joint compound receiving cavities. However, such structures are to be construed broadly, and shall not be limited to only those structures described herein, and any method of forming such cavities on a substrate are fully contemplated herein.

While there have been shown what are presently considered to be preferred embodiments of the present invention, it will be apparent to those skilled in the art that various changes and modifications can be made herein without departing from the scope and spirit of the invention.

What is claimed is:

1. A sealing tape for wall surface seams, cracks, and defects, the tape comprising:
   a substrate having a surface; and
   a mesh layer on the surface of the substrate, the mesh layer further comprising an array of filaments which, together with the substrate, define a plurality of inter-filament cavities exposed on one side of the sealing tape to receive joint compound for application to the wall surface spanning the seam, crack, or defect with the mesh layer against the wall surface.

2. The drywall sealing tape of claim 1, and further comprising an adhesive coating on the mesh layer.

3. The drywall sealing tape of claim 1, wherein said substrate is made from paper.

4. The drywall sealing tape of claim 1, wherein said substrate is made from a polymer.

5. The drywall sealing tape of claim 1, wherein said filaments are made from nylon.

6. The drywall sealing tape of claim 1, wherein said filaments are made from glass fibers.

7. The drywall sealing tape of claim 1, wherein said filaments are made from a synthetic material.

8. The drywall sealing tape of claim 7, wherein said synthetic material is a rigid vinyl.

9. The drywall sealing tape of claim 1, wherein said filaments are made from metal.

10. The drywall sealing tape of claim 9, wherein said filaments are coated with a corrosion-resistant coating.

11. The drywall sealing tape of claim 1, wherein said surface of said substrate is substantially covered by said mesh layer to define two longitudinal side strips.

12. The drywall sealing tape of claim 11, wherein said longitudinal side strips are pliable.

13. The drywall sealing tape of claim 1, wherein said substrate is coated with a joint-compound bonding material.

14. The drywall sealing tape of claim 1, wherein said mesh layer is coated with a joint-compound bonding material.

15. The drywall sealing tape of claim 1, wherein said inter-filament cavities have dimensions of approximately 0.10 inches wide, 0.10 inches long, and 0.025 inches thick.

16. A sealing tape for sealing joints between a first drywall panel and a second drywall panel, comprising:
   a substrate having a surface; and
   a pattern of protrusions extending from said surface to form a plurality of cavities exposed on one side of the sealing tape to receive joint compound for application to the wall surface spanning the seam, crack, or defect with the cavities facting the wall surface.

17. The drywall sealing tape of claim 16, wherein said pattern of protrusions is a checkerboard pattern.

18. The drywall sealing tape of claim 16, wherein said protrusions extending from said surface are formed from said substrate.

19. The drywall sealing tape of claim 16, wherein the protrusions extending from said surface are embossed in said substrate.

20. The drywall sealing tape of claim 16, wherein said protrusions are applied to the surface of said substrate.

21. A wall assembly, comprising:
   a first wall panel;
   a second wall panel adjacent to and coplanar with said first wall panel to define a seam therebetween;
   a length of sealing tape comprising a substrate having a surface, a mesh layer on the surface to define a plurality of cavities; and
   a coating of joint compound on the surface and within said plurality of cavities, said sealing tape being applied to the seam with the joint compound located between said sealing tape and said wall panels.

* * * * *